United States Patent [19]

Grube et al.

[11] Patent Number: 5,463,617

[45] Date of Patent: Oct. 31, 1995

[54] METHOD FOR PROVIDING CALLER INTERRUPT IN A TIME DIVISION MULTIPLEXED WIRELESS COMMUNICATION SYSTEM

[76] Inventors: Gary W. Grube, 157 Cedarwood Ct., Palatine, Ill. 60067; Brian K. Bunkenburg, 3416 N. Racine, Chicago, Ill. 60657; Marc C. Naddell, 2904 Heatherwood Dr., Schaumburg, Ill. 60193

[21] Appl. No.: 316,666

[22] Filed: Sep. 30, 1994

[51] Int. Cl.[6] .................................................. H04B 7/14
[52] U.S. Cl. .............................. 370/29; 370/62; 370/95.1; 370/110.1; 340/825.47; 379/63; 379/208; 455/34.2; 455/38.1; 455/54.2; 455/58.1
[58] Field of Search .................... 370/95.1, 76, 80, 370/95.2, 95.3, 110.1, 24, 29, 50, 62; 455/33.1, 33.2, 34.1, 34.2, 53.1, 54.1, 54.2, 57.1, 58.1, 89, 95, 38.1, 38.2; 379/58, 201, 60, 202, 61, 208; 340/825.44, 825.42

[56] References Cited

U.S. PATENT DOCUMENTS

| 4,754,450 | 6/1988 | Lynk, Jr. et al. | 370/29 |
|---|---|---|---|
| 4,942,570 | 7/1990 | Kotzin et al. | 370/80 |
| 5,117,501 | 5/1992 | Childress et al. | 455/34.1 |
| 5,249,304 | 9/1993 | Mulford | 455/34.1 |
| 5,274,837 | 12/1993 | Childress et al. | 455/34.2 |
| 5,274,842 | 12/1993 | Sasuta | 455/34.1 |
| 5,363,428 | 11/1994 | Nagashima | 455/34.1 |

*Primary Examiner*—Alpus Hsu
*Assistant Examiner*—Ricky Ngo
*Attorney, Agent, or Firm*—Christopher P. Moreno

[57] ABSTRACT

A first communication unit (101) transmits, to a central controller (105), a request for a group call. The central controller allocates a first inbound (11), a second inbound (12), and an outbound ($O_1$) wireless communication resource for use in the group call. At the central controller, primary voice signals from the first communication unit, received via the first inbound wireless communication resource, are summed (109) with interrupt voice signals from a second communication unit (102), received via the second inbound wireless communication resource, to produce summed voice signals. The summed voice signals and a busy signal (108) are transmitted via the outbound wireless communication resource, thereby allowing the second communication unit to interrupt the group call. Additionally, the central controller can allocate a third inbound communication resource (13) for use with priority interrupt voice signals which can also be summed with the primary and interrupt voice signals.

15 Claims, 2 Drawing Sheets

METHOD FOR PROVIDING CALLER INTERRUPT IN A TIME DIVISION MULTIPLEXED WIRELESS COMMUNICATION SYSTEM

FIELD OF THE INVENTION

The present invention relates generally to time division multiplexed (TDM) wireless communication systems and, in particular, to a method for providing caller interrupt therein.

BACKGROUND OF THE INVENTION

TDM wireless communication systems are known to comprise a central controller that allocates a plurality of wireless communication resources, via base stations operably connected to the central controller, among a plurality of communication units. In such systems, the communication units (i.e., hand-held or in-car mobile radios) are assigned wireless communication resources in the form of a radio frequency (RF) carrier divided by time into multiple timeslots. Often, the communication units are arranged into one or more talkgroups, as known in the art. Upon receiving a request from a communication unit, the central controller allocates wireless communication resources (i.e., timeslots) for use by the communication unit and any target units intended to receive voice signals transmitted by the communication unit. Once allocated, the wireless communication resources are typically dedicated to the transmission of the voice signals, thereby preventing other communication units from using the same resources to transmit other voice signals.

Sometimes, however, it is desirable to supersede or add information to an on-going voice signal transmission, without waiting for it to finish. This feature is generally referred to as caller interrupt. For example, several police units (i.e., communication units), organized into a talkgroup, may be canvassing a geographic region looking for a suspect vehicle. While a first of the patrol units is transmitting a verbal description of the suspects as well other information to the talkgroup, a second patrol unit may spot the suspects speeding by. The second unit would like to notify the other units of the suspect's location without delay. If the second unit could interrupt the first unit, the necessary information could be transmitted quickly. The type of access control provided by current TDM wireless communication systems determines how, if at all, a communication unit can perform caller interrupt.

Currently, TDM systems provide two types of access control: queue and contention. Referring to the previous example, if queued access control is used, the talk request of the second unit will be queued until the first unit is done talking. In this case, the second unit must wait to gain access to (i.e., be allocated) the same wireless communication resources currently use by the first unit. Hence, queued access control does not provide caller interrupt since the interrupting party must wait.

If contention access control is used, the call request from the second unit is processed immediately, allowing the second unit to transmit on the same wireless communication resources as the first unit. However, this generally results in destructive interference and, in many cases, neither message is heard. Thus, contention access control does not provide reliable caller interrupt. Therefore, a need exists for a method that provides caller interrupt in TDM wireless communication systems and that overcomes the difficulties associated with prior art queuing and contention methods.

DESCRIPTION OF A PREFERRED EMBODIMENT

Generally, the present invention provides a method for caller interrupt within a TDM wireless communication system. A first communication unit transmits a request for a group call to a central controller. In response to the request, the central controller allocates a first inbound, a second inbound, and an outbound wireless communication resource for use in the group call. As the central controller receives primary voice signals from the first communication unit via the first inbound wireless communication resource, it retransmits the primary voice signals via the outbound wireless communication resource. While the first communication unit continues to transmit, a second communication unit can transmit interrupt voice signals via the second inbound communication resource. Upon receipt, the interrupt voice signals are summed with the primary voice signals by the central controller to produce summed voice signals. The summed voice signals are then transmitted by the central controller via the outbound resource, thereby allowing the second communication unit to interrupt the group call. A busy signal, transmitted via at least a portion of the outbound communication resource, is sent by the central controller to indicate that the first and second inbound wireless communication resources are in use.

Additionally, the central controller can allocate a third inbound communication resource for use with priority interrupt signals, which signals, when received, can be summed with both the primary and interrupt voice signals. As usage of the first and second inbound wireless communication resources varies, the central controller may also transmit a resource update message. In this manner, caller interrupt of group calls may be provided.

Figure 1:
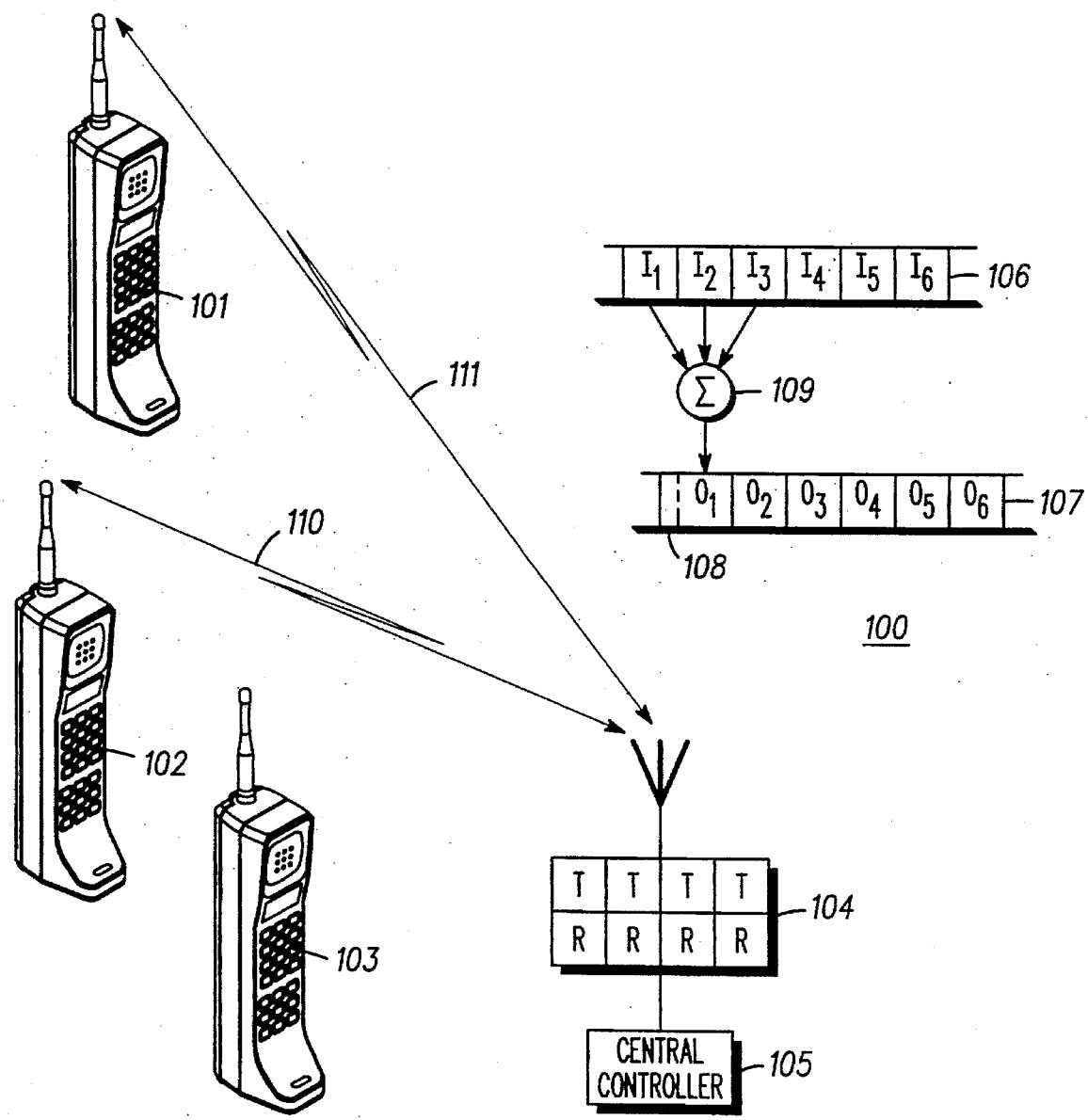
FIG. 1 illustrates a TDM wireless communication system in accordance with the present invention.

The present invention can be more fully described with reference to FIGS. 1–2. FIG. 1 illustrates a TDM wireless communication system 100 that includes a plurality of communication units 101–103 and a plurality of base stations 104. The communication units 101–103, which can be MIRS™ portable radios by Motorola, Inc., provide voice signals in the form of compressed digital audio.

The base stations 104, which can be MIRS™ base stations by Motorola, Inc., transceive RF carriers 110–111 that are allocated among the communication units 101–103 by a central controller 105. The central controller 105, which can be a MIRS™ Dispatch Application Controller (DAP) by Motorola, Inc., provides the allocation control of wireless communication resources 106–107 in response to requests from the communication units 101–103. The central controller 105 also includes a summer 109, shown disconnected from the central controller 105 for convenience, that is discussed in further detail below. It is understood that the summer 109 can be implemented elsewhere in the TDM wireless communication system 100, such as one of the base stations 104 or other infrastructure equipment not shown in FIG. 1.

In a preferred embodiment, the wireless communication resources 106–107 comprise timeslots on the RF carriers 110–111. The wireless communication resources 106–107 are separated into six inbound wireless communication resources $I_1$–$I_6$ and six outbound wireless communication resources $O_1$–$O_6$. The number of timeslots (i.e., wireless communication resources) is a design choice; others numbers are possible. The inbound wireless communication resources $I_1$–$I_6$ are used for communications from the communication units 101–103 to the base stations 104 and central controller 105. The outbound wireless communication resources $O_1$–$O_6$ are used for communications from the base stations 104 and central controller 105 to the communication units 101–103. The wireless communication resources 106–107 are generally used to communicate control information, such as call requests and call assignments as well as message information, such as compressed digital voice or data. It is also possible to combine both control information and message information into a single timeslot by allocating the proper number of bits for each, as is well known in the art.

Figure 2:
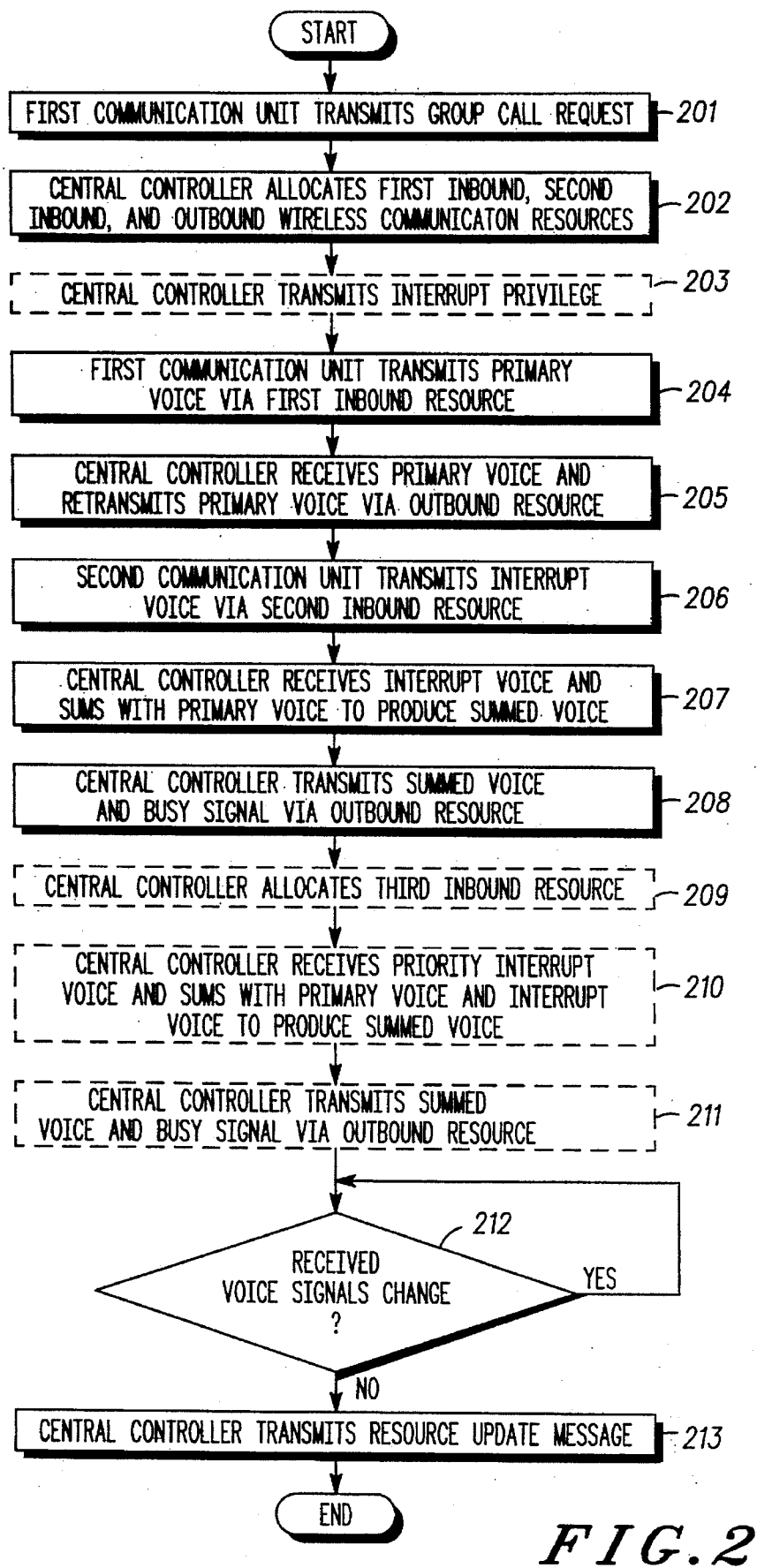
FIG. 2 illustrates a flowchart that may be used to implement caller interrupt in a TDM wireless communication system in accordance with the present invention.

FIG. 2 illustrates a method for caller interrupt in a TDM wireless communication system in accordance with the present invention. At step 201, a first communication unit 101 transmits a request for a group call on a wireless communication resource 106 allocated by the central controller 105 for the purposes of inbound control information. For the purposes of illustration, it is hereinafter assumed that the communication units 101–103 form a communication group and, more particularly, the communication group designated by the request.

The base stations 104 receive the request and forward it to the central controller 105. Assuming availability of wireless communication resources, the central controller 105 allocates a first inbound wireless communication resource $I_1$, a second inbound wireless communication resource $I_2$, and an outbound wireless communication resource $O_1$ responsive to the request for the group call 202. As know in the art, the central controller 105 allocates wireless communication resources by transmitting an outbound control message, via the broadcast units 104, to the target group designated by the request. The control message informs members of the group which wireless communication resources to use during the upcoming group call.

At step 203, the central controller 105 optionally transmits interrupt privileges to selected members of the communication group. The interrupt privileges may be included with the initial allocation of step 202, or they may be transmitted after allocation on the outbound wireless communication resource $O_1$. In the context of the present invention, interrupt privileges comprise control information indicating which communication units can do various types of interrupts. Use of the interrupt privileges is discussed in further detail below.

Having been allocated wireless communication resources 202, the first communication unit $10_1$ transmits primary voice signals 204 via the first inbound wireless communication resource $I_1$. The central controller 105 receives the primary voice signals, via the base stations 104, and retransmits the primary voice signals 205 on the outbound wireless communication resource $O_1$. In this manner, the primary voice signals are received by the entire communication group.

While receiving the primary voice signals, a second communication unit 102 of the communication group transmits interrupt voice signals 206 on the second inbound wireless communication resource $I_2$. In order to transmit interrupt voice signals, the second communication unit must have the privilege to do so. If the second communication unit is one of the selected members of the communication group, and the interrupt privileges were transmitted at step 203, the second communication unit will have the privilege of transmitting interrupt voice signals. If no interrupt privileges were sent at step 203, it is assumed that interrupt privileges have been pre-programmed into the selected members of the communication group.

Given that the second communication unit has the correct privileges to transmit interrupt voice signals, the central controller 105 receives the interrupt voice signals and, using the summer 109, sums the interrupt voice signals with the primary voice signals 207 to produce summed voice signals.

In addition to transmitting the summed voice signals, the central controller 105 also transmits a busy signal 108 via the outbound wireless communication resource $O_1$ to indicate that both the first and second inbound wireless communication resources $I_1$–$I_2$ are busy 208. In a preferred embodiment, the busy signal 108 comprises a portion of the outbound wireless communication resource $O_1$, such as a single bit. By monitoring the busy signal 108, the communication units 101–103 in the communication group can determine if both the first and second inbound wireless communication resources $I_1$–$I_2$ are busy. It is recognized that a separate timeslot (e.g., $O_2$) within the wireless communication resources 107 can be used for the busy signal 108. In this manner, the second communication unit 102 is able to interrupt the primary voice signals of the first communication unit $10_1$.

It is possible that when both the first and second inbound wireless communication resources $I_1$–$I_2$ are busy, a third communication unit 103 may also need to transmit priority interrupt voice signals, as in an emergency. Once again using the example of police units searching for a suspect, consider two communication units speaking at the same time about the potential location of the suspect vehicle. Using the above procedure, both the first and second inbound wireless communication resources would be busy. If a third police unit is taking gunfire from the suspect's vehicle, the third unit has an immediate priority need to further interrupt the group call.

To address this situation, the central controller 105 can allocate 209 a third inbound wireless communication resource $I_3$ when the first and second inbound wireless communication resources $I_1$–$I_2$ are in use. Similar to the allocation of the first and second inbound wireless communication resources $I_1$–$I_2$, the allocation of the third inbound wireless communication resource $I_3$ is achieved using an outbound control message. This outbound control message can be sent over the outbound wireless communication resource $O_1$, or via another wireless communication resource 107.

At step 210, the central controller 105 receives priority interrupt voice signals, via the third inbound wireless communication resource $I_3$, and the summer 109 sums the primary, interrupt, and priority interrupt voice signals to produce the summed voice signals. In a first embodiment, all communication units 101–103 in the communication group may transmit priority interrupt voice signals. This is desirable because any of the communication units 101–103 may require an emergency priority. In a second embodiment of the present invention, only the selected members of the communication group may transmit priority interrupt voice signals. This may be desirable in instances where a supervisory communication unit, such as a chief of police for example, may want to supersede all other transmissions.

Regardless of which communication unit is transmitting the priority interrupt voice signals, the summed voice signals are transmitted 211, along with the busy signal 108, via the outbound wireless communication resource $O_1$. In order to indicate that the first, second, and third inbound wireless communication resources $I_1$–$I_3$ are all busy, the busy signal 108 may need to be expanded. That is, if a single bit is used for the busy signal 108 when only the first and second inbound wireless communication resources $I_1$–$I_2$ are busy, the busy signal 108 would need to be expanded to two or more bits when the third inbound wireless communication resource $I_3$ is also busy.

The process of summing voice signals received via the first, second, and possibly third, inbound wireless communication resources $I_1$–$I_3$ continues until there is a change in the received (inbound) voice signals, i.e., one of the communication units discontinues its transmission or has gone out of range 212. The present invention does not dictate that the first, second, and third inbound wireless communication resources $I_1$–$I_3$ must always be used for primary, interrupt, and priority interrupt voice signals, respectively. To the contrary, the present invention allows any of the allocated inbound timeslots to take on a new role.

For example, assume that the first, second, and third inbound wireless communication resources $I_1$–$I_3$ are currently in use. When usage of any of the three inbound wireless communication resources $I_1$–$I_3$ is discontinued in this case, the now-free inbound wireless communication resource is used only for further priority interrupt voice signals. This reassignment is communicated to the communication units 101–103 in the communication group via a resource update message, i.e., an outbound control message 213.

In another example, assume that only the first and second inbound wireless communication resources $I_1$–$I_2$ are currently in use, and that the third inbound wireless communication resource $I_3$ is allocated, but not in use. When usage of either of the two inbound wireless communication resources $I_1$–$I_2$ is discontinued, the central controller can transmit a resource update message to the communication units 101–103 indicating that the third inbound wireless communication resource $I_3$ is to be used for interrupt voice signals, and that the now-unused inbound wireless communication resource has been deallocated.

The present invention provides a method for caller interrupt of a group call within a TDM wireless communication system. With such a method, the problems of wait times and destructive interference found in prior art systems using queuing or contention access control are substantially eliminated. By assigning a first inbound, a second inbound, and outbound wireless communication resource at the beginning of a group call, the present invention allows primary and interrupt voice signals to be summed and subsequently transmitted as summed voice signals. In this manner, the interrupt voice signals are allowed to interrupt the primary voice signals.

We claim:

1. In a TDM wireless communication system that includes a plurality of communication units arranged into at least one communication group, a plurality of wireless communication resources, and a central controller that allocates the plurality of wireless communication resources among the plurality of communication units, a method for providing caller interrupt, the method comprising the steps of:

a) transmitting, by a first communication unit of the at least one communication group, a request for a group call;

b) upon receiving the request, allocating, by the central controller, a first inbound wireless communication resource, a second inbound wireless communication resource, and an outbound wireless communication resource;

c) transmitting, by the first communication unit via the first inbound communication resource, primary voice signals:

d) receiving, by the central controller via the first inbound wireless communication resource, the primary voice signals;

e) retransmitting, by the central controller, the primary voice signals via the outbound wireless communication resource;

f) transmitting, by a second communication unit of the at least one communication group, interrupt voice signals on the second inbound wireless communication resource while the first communication unit is currently transmitting;

g) receiving, by the central controller via the second inbound wireless communication resource, the interrupt voice signals;

h) summing, by the central controller, the interrupt voice signals and the primary voice signals to produce summed voice signals; and i) transmitting, by the central controller, the summed voice signals on the outbound wireless communication resource, thereby providing caller interrupt.

2. The method of claim 1, wherein step (b) further comprises the step of:

b1) transmitting, by the central controller via the outbound wireless communication resource, interrupt privileges to members of a set of communication units of the at least one communication group such that only the members of the set can transmit interrupt voice signals.

3. The method of claim 1, wherein step (b) further comprises the step of allocating a first time slot on a first radio frequency carrier as the first inbound wireless communication resource.

4. The method of claim 3, wherein step (b) further comprises the step of allocating a second time slot on the first radio frequency carrier as the second inbound wireless communication resource.

5. The method of claim 4, wherein step (b) further comprises the step of allocating a first time slot on a second radio frequency carrier as the outbound wireless communication resource.

6. The method of claim 5, further comprising the step of:

j) transmitting, by the central controller via at least a portion of the outbound wireless communication resource, a busy signal indicating that first inbound wireless communication resource and the second inbound wireless communication resource are in use.

7. The method of claim 4, further comprising the steps of:

j) allocating, by the central controller, a third inbound wireless communication resource;

k) receiving, by the central controller via the third inbound wireless communication resource, priority interrupt voice signals from a third communication unit of the at least one communication group;

l) summing, by the central controller, the priority interrupt voice signals, the interrupt voice signals and the primary voice signals to produce the summed voice signals; and m) transmitting, by the central controller, the summed voice signals on the outbound wireless communication resource.

8. The method of claim 7, wherein step (k) further comprises the step of allocating a third time slot on the first radio frequency carrier as the third inbound wireless communication resource.

9. The method of claim 7, further comprising the steps of:

n) when the second communication unit continues transmitting on the second inbound wireless communication resource and the first communication unit has discontinued transmitting on the first inbound wireless communication resource, transmitting, by the central controller, a resource update message indicating that the first inbound wireless communication resource is for priority interrupt voice signals; and o) when the first communication unit continues transmitting on the first inbound wireless communication resource and the second communication unit has discontinued transmitting on the second inbound wireless communication resource, transmitting, by the central controller, a resource update message indicating that the second inbound wireless communication resource is for priority interrupt voice signals.

10. In a TDM wireless communication system that includes a plurality of communication units arranged into at least one communication group, a plurality of wireless communication resources, and a central controller that allocates the plurality of wireless communication resources among the plurality of communication units, a method for the central controller to provide caller interrupt, the method comprising the steps of:

a) receiving, from a first communication unit of the at least one communication group, a request for a group call;

b) upon receiving the request, allocating a first inbound wireless communication resource, a second inbound wireless communication resource, and an outbound wireless communication resource;

c) receiving primary voice signals via the first inbound wireless communication resource;

d) retransmitting the primary voice signals via the outbound wireless communication resource;

e) receiving interrupt voice signals via the second inbound wireless communication resource;

f) summing the interrupt voice signals and the primary voice signals to produce summed voice signals; and g) transmitting the summed voice signals via the outbound wireless communication resource, thereby providing caller interrupt.

11. The method of claim 10, wherein step (b) further comprises the step of:

b1) transmitting, via the outbound wireless communication resource, interrupt privileges to members of a set of communication units of the at least one communication group such that only the members of the set of communication units can transmit interrupt voice signals.

12. The method of claim 11, wherein step (b) further comprises the step of allocating a first time slot on a first radio frequency carrier as the first inbound wireless communication resource.

13. The method of claim 12, wherein step (b) further comprises the step of allocating a second time slot on the first radio frequency carrier as the second inbound wireless communication resource.

14. The method of claim 13, wherein step (b) further comprises the step of allocating a first time slot on a second radio frequency carrier as the outbound wireless communication resource.

15. The method of claim 14, further comprising the step of:

h) transmitting, via at least a portion of the outbound wireless communication resource, a busy signal indicating that first inbound wireless communication resource and the second inbound wireless communication resource are in use.

* * * * *